Patented June 23, 1953

2,643,213

UNITED STATES PATENT OFFICE 2,643,213

METHOD FOR THE PRODUCTION OF VITAMIN $B_{12}$ BY STREPTOMYCES OLIVACEUS

Harlow H. Hall, Peoria, Ill., assignor to the United States of America as represented by the Secretary of Agriculture No Drawing. Application March 23, 1951, Serial No. 217,283

9 Claims. (Cl. 195—80)

(Granted under Title 35, U. S. Code (1952), sec. 266)

The invention herein described may be manufactured and used by or for the Government of the United States of America for governmental purposes throughout the world without the payment to me of any royalty thereon.

This invention relates to the production of vitamin $B_{12}$ by microbiological processes. It relates more particularly to a method for producing the vitamin in high yield by cultivating a nutrient medium containing Streptomyces olivaceus.

A number of microorganisms have been reported as capable of producing vitamin $B_{12}$, among which are bacteria and actinomycetes, the latter being principally species of Streptomyces. Heretofore, commercially available vitamin $B_{12}$ products have usually been obtained as secondary products from antibiotic fermentations. Previously reported yields of vitamin $B_{12}$ from either antibiotic- or non-antibiotic-producing organisms range from 0.5 to 0.6 or 0.8 $\mu$grams per ml. of culture liquor.

I have discovered that Streptomyces olivaceus biosynthesizes vitamin $B_{12}$ in relatively great yield, the yield being in sufficient quantity to make a primary vitamin $B_{12}$ fermentation economically feasible. Contrary to previously known organisms producing vitamin $B_{12}$ as a primary fermentation product, Streptomyces olivaceus biosynthesizes the vitamin in yields which are 2 to 5 fold that of known organisms.

According to the invention, a medium is made up comprising an assimilable carbon source, a source of assimilable nitrogen, a soluble salt of cobalt, and the usual mineral nutrients. The organism is then added in the form of an inoculum, and the medium fermented aerobically. The time of fermentation is usually within the range of 40 to 72 hrs. As the assimilable carbon source, it is advantageous to add approximately 1.0 percent of a material such as glucose, sucrose, lactose, maltose, starch, beet molasses, cane molasses, or the like. The amount may vary from 0.2 to 2.5 percent of carbon source. Concentrations up to about 1.0 percent enhances cell production. Levels higher than 2.5 percent appear to inhibit production of the vitamin to some extent.

As source of assimilable nitrogen, I may employ distillers' solubles, mycelium from penicillin fermentations, soybean meal, peanut meal, cottonseed meal, corn steep liquor, peptone, lactalbumen; in general, any of the commonly used proteinaceous or partially hydrolyzed proteinaceous materials. The source of nitrogen may also comprise pure chemical compounds, such as urea, ammonium salts, and the like.

The soluble salt of cobalt may be, for example, cobalt chloride, sulfate, nitrate, or the like, the cobaltous ion being required within the range of 1.0 up to as high as 50 or 60 p. p. m., calculated as $CoCl_2 \cdot 6H_2O$. The upper limit of cobaltous ion appears to be relatively non-critical; however, for reasons of economic convenience and preference I employ approximately 1.5 p. p. m. cobaltous ion calculated as $CoCl_2 \cdot 6H_2O$.

The hydrogen ion concentration at the beginning of the fermentation should be no lower than 6.5 for optimum results. I prefer to initiate the fermentation at a pH of about 6.5–7.5, 7.0–7.2, giving particularly advantageous results. As the fermentation proceeds, the alkalinity increases gradually, rising to about 8.0–8.5 at the end of the fermentation. The hydrogen ion concentration may be adjusted initially, if necessary, by the use of alkali, such as sodium hydroxide. I have found it advantageous to add a small amount, say about ½ to 1 percent of calcium carbonate. This does not appear to affect the yield of vitamin, and tends to maintain the fermentation in a desirable pH range.

For optimum results, the fermentation is carried out under submerged aerobic conditions. The agitation and rate of aeration depend largely upon the quantity of culture liquor, the type of fermentor and similar factors. The agitation and aeration rate are not critical, and the invention is not limited to any specific values for these variables. I have found, however, that the addition of about 0.5 volume of air per volume of medium per minute gives satisfactory results in my equipment.

The amount of inoculum added to the fermentation medium is not critical, although I prefer to add a pregerminated inoculum in an amount of 3 to 10 percent by volume of the fermentation medium. The temperature of the fermentation should be maintained within the range of 25° to 35° C., 28°–30° C. being optimum. Usually it is unnecessary to add an agency to control foam. However, such substances as octadecanol may be used if required.

In carrying out the invention I employ about .2 to 3.0 percent fermentable carbohydrate, 3 to 6 percent assimilable nitrogen source, and 1–20 p. p. m. of cobalt, calculated as $CoCl_2 \cdot 6H_2O$.

Vitamin $B_{12}$ may be determined quantitatively by the microbiological assay procedure of Skeggs et al. in J. Biol. Chem. 176, 1459 (1948), using

*Lactobacillus leichmanni* ATCC 4797 as the assay organism.

The following specific examples illustrate the invention. The parts are by weight unless otherwise specified.

Example 1

Ten liters of the following medium were prepared:

| | | |
|---|---|---|
| Distillers' dry solubles | percent | 4.0 |
| Glucose | do | 1.0 |
| $CaCO_3$ | do | 1.0 |
| $CoCl_2 \cdot 6H_2O$ | p. p. m. | 3.0 |

The medium was sterilized for 45 minutes at 120° C. within the fermentor, and the pH was adjusted to 7.0–7.2 with strong NaOH. The medium was used in a 20-liter stainless steel fermentor equipped with an air sparger, agitator, and an automatic temperature control unit.

The inoculum had been previously prepared as follows. Spores from a stock culture of *Streptomyces olivaceus* were incubated in a shaken flask for 24–48 hrs., then transferred to production medium in Fernbach flasks on a rotary shaker for 48 hrs. Five percent inoculum was used in the fermentor. The temperature of the fermentation was maintained at 28°–30° C., and air was introduced at 0.5 volume per volume of medium per minute, and at the same time the agitator was driven at approximately 200 R. P. M. The fermentation continued for 64 hrs. during which time the pH rose gradually from 7.1 to 8.25. The glucose content of the medium had disappeared at the 40th hr. Assay of the final culture liquor showed 2.5 µg. per cc. at the end of the 48th hr., and 3.0 µg. per cc. at the end of the 64th hr. The assay method employed was that previously noted using *Lactobacillus leichmannii*.

Example 2

The procedure of Example 1 was repeated except that the distillers' solubles were replaced by mycelium of a penicillin fermentation. Furthermore, the calcium carbonate and cobalt were reduced by half. At the end of 64 hrs. fermentation, the culture liquor assayed 2.0 µg. per cc.

The vitamin $B_{12}$ content of the culture liquor may be concentrated by evaporation. For example, the culture liquor may be evaporated to a syrup and the syrup employed to fortify feed or food material. Moreover, the syrup may be dried as on a drum drier to produce a dry product rich in vitamin $B_{12}$. The products of this invention, rich in vitamin $B_{12}$, were evaluated in standard animal nutritional tests and were found to satisfy the vitamin $B_{12}$ nutritional requirements of the test animals.

I claim:

1. Method comprising cultivating *Streptomyces olivaceus* in an aqueous nutrient medium comprising an assimilable fermentable carbohydrate source, an assimilable nitrogen source, and a source of cobalt ion, incubating the culture under submerged aerobic conditions, the initial pH of the fermentation being at no lower than about pH 6.5, the temperature being in the range 25° to 30° C., to produce vitamin $B_{12}$.

2. Method comprising cultivating *Streptomyces olivaceus* in an aqueous nutrient medium comprising glucose, an assimilable nitrogen source, a source of cobalt ion, incubating the culture under submerged aerobic conditions, continuing the cultivation at least several hours beyond the time required to exhaust the glucose, the initial pH of the medium being not lower than about pH 6.5, the temperature being in the range 25° to 35° C., to produce vitamin $B_{12}$.

3. Method for the production of vitamin $B_{12}$ which comprises aerobically cultivating *Streptomyces olivaceus* in an aqueous nutrient medium comprising an assimilable carbohydrate source, an assimilable nitrogen source, and a source of cobalt ion, the cultivation being initiated at about 6.5 to 7.5 pH, alkali being added, if necessary, to adjust the pH initially within this range, calcium carbonate being added to assist in maintaining the fermentation in the desired pH range, the alkalinity increasing gradually to about pH 8.0 to 8.5 at the end of the fermentation.

4. A method for the production of vitamin $B_{12}$ which comprises aerobically cultivating *Streptomyces olivaceus* in a nutrient medium comprising about 0.2 to 3.0 percent fermentable assimilable carbohydrate, about 3 to 6 percent assimilable nitrogen source, and one to 60 parts per million of cobalt, calculated as $CoCl_2.6H_2O$, at 25° to 35° C., the fermentation being initiated at no lower than about pH 6.5, sodium hydroxide being added for this purpose where necessary, about one-half to one percent of calcium carbonate being added to assist in maintaining the fermentation in the desired pH range.

5. The process of claim 4 in which the cultivation is under submerged aerobic conditions.

6. The process of claim 4 in which the cultivation is under submerged aerobic conditions, air being introduced at about 0.5 volume per volume of medium per minute.

7. The process of claim 4 in which the cultivation is under submerged aerobic conditions, the carbohydrate comprises glucose, the source of assimilable nitrogen is distiller's solubles, and the cobalt is present as cobalt chloride.

8. The process of claim 4 in which the cultivation is under submerged aerobic conditions, the carbohydrate comprises glucose, the source of assimilable nitrogen is mycellium of a penicillin fermentation.

9. A method for producing vitamin $B_{12}$ which comprises cultivating *Streptomyces olivaceus* in an aqueous nutrient medium containing a source of assimilable carbon, a source of assimilable nitrogen, and a source of cobalt ion, under submerged aerobic conditions, at an initial pH no lower than 6.5 for a period of 40 to 72 hours, and recovering fermentation products comprising vitamin $B_{12}$ from the culture liquor.

HARLOW H. HALL.

References Cited in the file of this patent

UNITED STATES PATENTS

| Number | Name | Date |
|---|---|---|
| 2,530,416 | Wolf | Nov. 21, 1950 |
| 2,595,499 | Wood | May 6, 1952 |

OTHER REFERENCES

Bergey's Manual of Determinative Bacteriology, 6 ed., 1948, Williams and Wilkins Co., page 950.

Rickes et al., Science, 108, Dec. 3, 1948, pages 634, 635.

Hendlin et al., Science, III, May 19, 1950, pages 541–542.